US011015928B2

(12) United States Patent
Cao et al.

(10) Patent No.: US 11,015,928 B2
(45) Date of Patent: May 25, 2021

(54) METHOD AND APPARATUS FOR ULTRA-WIDE CIRCULAR SCANNING IMAGING BY OPTICAL SATELLITE

(71) Applicant: HARBIN INSTITUTE OF TECHNOLOGY, Heilongjiang (CN)

(72) Inventors: Xibin Cao, Heilongjiang (CN); Feng Wang, Heilongjiang (CN); Huayi Li, Heilongjiang (CN)

(73) Assignee: HARBIN INSTITUTE OF TECHNOLOGY, Heilongjiang (CN)

( * ) Notice: Subject to any disclaimer, the term of this patent is extended or adjusted under 35 U.S.C. 154(b) by 135 days.

(21) Appl. No.: 16/320,879

(22) PCT Filed: Aug. 2, 2017

(86) PCT No.: PCT/CN2017/095608
§ 371 (c)(1),
(2) Date: Jan. 25, 2019

(87) PCT Pub. No.: WO2018/157550
PCT Pub. Date: Sep. 7, 2018

(65) Prior Publication Data
US 2019/0257651 A1 Aug. 22, 2019

(30) Foreign Application Priority Data
Mar. 1, 2017 (CN) .......................... 201710118991.7

(51) Int. Cl.
*G01C 21/18* (2006.01)
*G03B 37/00* (2021.01)
(Continued)

(52) U.S. Cl.
CPC ............ *G01C 11/025* (2013.01); *B64D 47/08* (2013.01); *G03B 15/006* (2013.01); *G03B 37/04* (2013.01)

(58) Field of Classification Search
CPC ...... G01C 11/025; G01C 21/18; B64D 47/08; G03B 15/006; G03B 37/04; G03B 37/02;
(Continued)

(56) References Cited

U.S. PATENT DOCUMENTS

| 4,313,678 A | 2/1982 | Colvocoresses |
| 2004/0105090 A1* | 6/2004 | Schultz ..................... G06T 7/60 356/141.5 |

(Continued)

FOREIGN PATENT DOCUMENTS

| CN | 101275847 A | 10/2008 |
| CN | 101943602 A | 1/2011 |

(Continued)

OTHER PUBLICATIONS

International Search Report for Application No. PCT/CN2017/0956608, dated Dec. 6, 2017.

*Primary Examiner* — Patrick E Demosky
(74) *Attorney, Agent, or Firm* — Marshall, Gerstein & Borun LLP

(57) ABSTRACT

A technology for ultra-wide circular scanning imaging by an optical satellite is provided. Calculating an angle $\theta_1$ between the outermost field of view of an area array camera (2) and an earth-pointed axis (q) of a satellite (1) according to the width W required for ground imaging coverage in a direction perpendicular to the flight direction (b) of the satellite (1) and according to the height h of the orbit of the satellite (1); installing the area array camera (2) on a side surface of the satellite (1) according to the angle $\theta_1$; calculating the maximum rotation angle $\omega_{max}$ allowed by the satellite (1) according to the minimum exposure time T of a detector of the satellite (1) and the worst ground pixel resolution r of the satellite (1); selecting a rotation speed $\omega$ of the satellite (1)
(Continued)

that is less than $\omega_{max}$, and setting the rotation speed $\omega$ to be the rotation speed relative to the ground.

2 Claims, 2 Drawing Sheets

(51) Int. Cl.
  *G01C 11/02* (2006.01)
  *B64D 47/08* (2006.01)
  *G03B 15/00* (2021.01)
  *G03B 37/04* (2021.01)
(58) Field of Classification Search
  CPC ............ G03B 2205/0038; G03B 37/00; G06T 3/4038
  See application file for complete search history.

(56) References Cited

U.S. PATENT DOCUMENTS

| 2015/0367958 A1 | 12/2015 | Lapstun et al. |
| 2016/0150142 A1* | 5/2016 | Lapstun ................. G03B 15/00 348/36 |

FOREIGN PATENT DOCUMENTS

| CN | 102063558 A | 5/2011 |
| CN | 103076005 A | 5/2013 |
| CN | 203909294 U | 10/2014 |

* cited by examiner

METHOD AND APPARATUS FOR ULTRA-WIDE CIRCULAR SCANNING IMAGING BY OPTICAL SATELLITE

CROSS REFERENCE TO RELATED APPLICATIONS

This application is a national application of PCT/CN2017/095608, filed on Aug. 2, 2017, which claims the benefit of Chinese Priority Patent Application 201710118991.7, filed Mar. 1, 2017, the entire contents of which are incorporated herein by reference.

TECHNICAL FIELD

The disclosure belongs to a technical field of satellite imaging, and more particularly relates to a method and apparatus for ultra-wide circular scanning imaging by an optical satellite.

BACKGROUND

Satellite imaging mainly includes area-array imaging and push-broom imaging. The area-array imaging adopts charge-coupled apparatus (CCD) of area-array to collect one image at a time. The push-broom imaging usually adopts linear-array CCD to collect one line of images at a time when the satellite flies forward with a detector for imaging positioned in a direction perpendicular to the satellite flight direction. The size of the image range depends on a field of view of the CCD in the detector, in case that the field of view of an optical camera is fixed, an imaging resolution and an imaging width of the optical imaging satellite are mutually influenced. Generally, an area-array camera is limited by an angle of field of view, and its imaging width is relatively narrow. At present, a common optical remote sensing satellite imaging method adopts splicing of multiple CCDs, combining of multiple area-array cameras or simultaneously increasing of a side swing capability of the area-array camera to increase the imaging range. In this case, the side swing of the area-array camera can only increase the area that can be imaged, but cannot increase the image coverage. Many methods such as splicing of multiple CCDs, combining of multiple area-array cameras can increase the image coverage to a certain extent, but these methods greatly increase the size, weight and power consumption of the satellite, and are also limited by other restrictions and cannot be arbitrarily spliced. All of the above technical solutions are aimed at satellite static imaging, but cannot meet imaging requirements of low-orbit small satellite platform, meter-level resolution and a coverage width of thousands of kilometers.

SUMMARY

The disclosure provides a method for ultra-wide circular scanning imaging by an optical satellite in order to solve a problem that the meter-level resolution of a low-orbit small satellite cannot meet thousands of kilometers imaging coverage width.

The disclosure describes a method for ultra-wide circular scanning imaging by an optical satellite, the method is implemented based on a detector, a processor, and a memory. The detector is used for imaging and is implemented by an area-array camera, the processor is used for imaging processing and sending the processed signal to a memory for storage, and the memory is used for storing the processed image sent by the processor;

the specific steps of the method for ultra-wide circular scanning imaging by an optical satellite are as follows:

step 1: calculating an angle $\theta_1$ between an outermost field of view of the detector and an earth-pointed axis of satellite according to a width W required for ground imaging coverage in a direction perpendicular to a satellite flight direction and a height h of a satellite orbit; installing the detector on a side surface of the satellite according to the angle $\theta_1$ between the outermost field of view of the area-array camera and the earth-pointed axis of satellite;

step 2: calculating a maximum rotation angle $\omega_{max}$ allowed by the satellite according to a minimum exposure time T of the detector on the satellite and a worst ground pixel resolution r of the detector on the satellite;

step 3: selecting a rotation speed of satellite, $\omega<\omega_{max}$, and calculating a ground imaging width $L_1$ of the detector in the satellite flight direction;

step 4: calculating a ground imaging width $L_2$ of the detector in a direction perpendicular to the satellite flight direction according to a photographing frequency f of the detector and the ground imaging coverage width $L_1$ of the detector in the satellite flight direction described in step 3;

step 5: setting the rotation speed $\omega$ of the satellite selected in step 3 to be the satellite rotation speed relative to a ground, so that there is no gap between two adjacently-circular-scanning-imaged areas of the detector, thereby achieving an ultra-wide circular scanning imaging by the optical satellite.

On a basis of a conventional satellite area-array imaging, the disclosure sets a certain angle between the optical axis of the detector and the satellite earth-pointed axis, and the whole satellite rotates around the earth-pointed axis at a fixed angular velocity during photographing, and the detector performs imaging according to a specific photographing frequency. Due to the flight and spinning of the satellite, the area-array camera performs imaging on the ground as a spiral strip with a certain width. If the distance traveled by the satellite in the flight direction within per rotation circle of the satellite is less than the width of the spiral band, seamless splicing can be ensured, and then the detector sweeps a relatively wide band on the ground, thus realizing ultra-wide coverage imaging.

Figure 1:
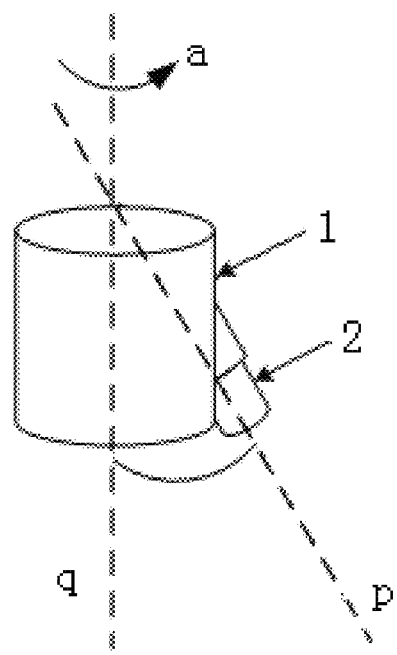
FIG. 1 is a schematic diagram of an installation structure of an optical satellite and an area-array camera according to the present disclosure.
Figure 2:
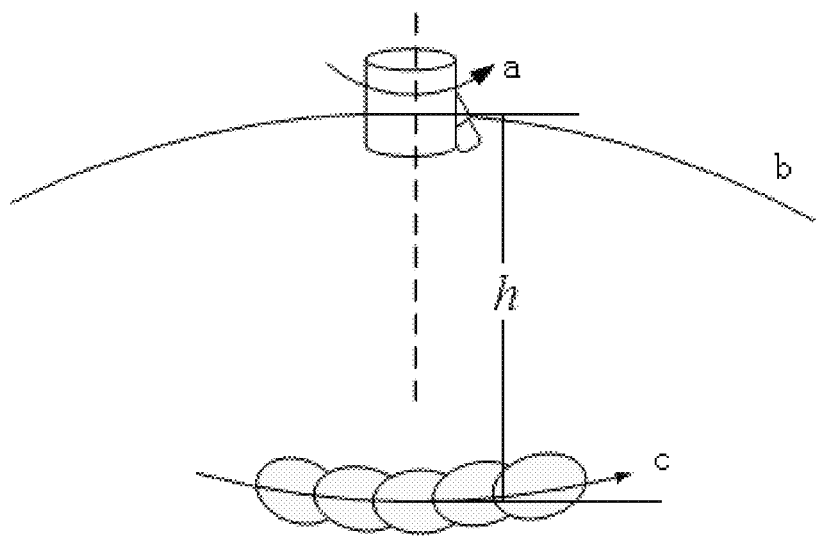
Figure 3:
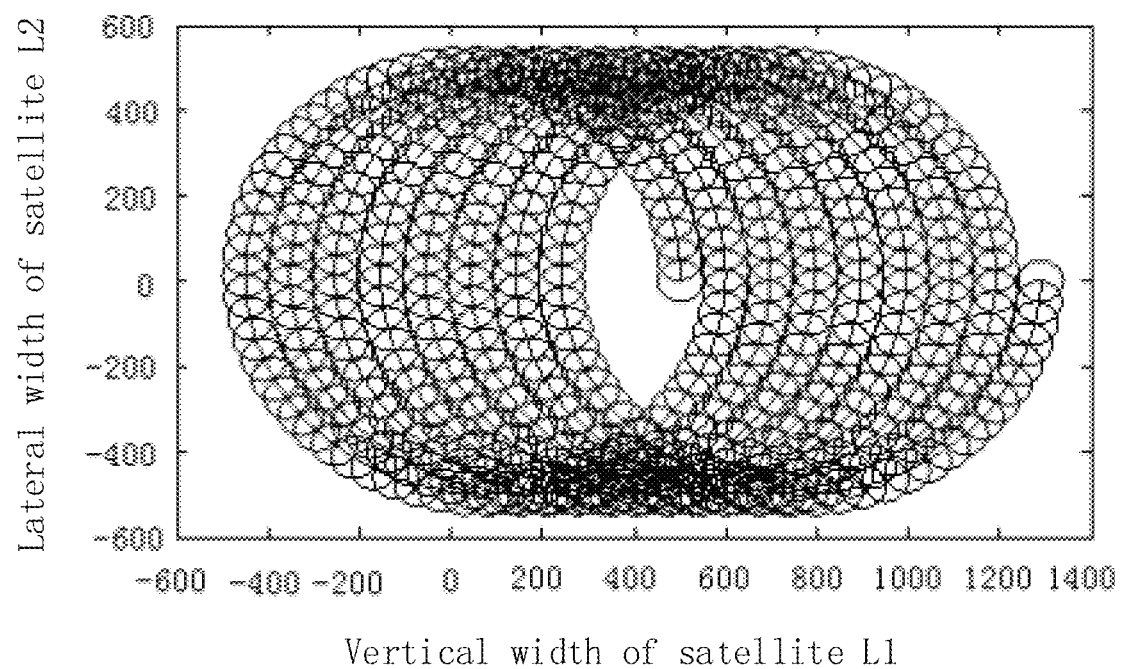

in the figure, reference numeral "a" denotes a satellite spinning direction, "1" denotes the satellite, "2" denotes the area-array camera, "p" denotes the optical axis of the area-array camera, and "q" denotes the earth-pointed axis of the satellite;

FIG. 2 is a schematic diagram of an optical satellite circular scanning process; in the figure, reference numeral "b" denotes the satellite flight direction and "c" denotes a movement direction of a bottom surface imaging; and FIG. 3 is a schematic diagram of circular scanning imaging of an optical camera.

DETAILED DESCRIPTION

In order to make the object, technical scheme and advantages of the present disclosure clearer, the present disclosure will be described in further detail taken in conjunction with the accompanying drawings and embodiments. It should be understood that the specific embodiments described herein are only for the purpose of explaining the present disclosure and are not intended to limit the present disclosure.

Embodiment 1: this embodiment will be described with reference to FIGS. 1 to 3. The method for ultra-wide circular scanning imaging by an optical satellite described in this embodiment is implemented based on a detector, a processor and a memory. The detector is used for imaging and is implemented by an area-array camera, the processor is used for imaging processing and sending the processed signal to a memory for storage, and the memory is used for storing the processed image sent by the processor.

The specific steps of the method for ultra-wide circular scanning imaging by an optical satellite are as follows:

step 1: calculating an angle $\theta_1$ between an outermost field of view of the detector and an earth-pointed axis of a satellite according to a width W required for ground imaging coverage in a direction perpendicular to a satellite flight direction and a height h of a satellite orbit; installing the detector on a side surface of the satellite according to the angle $\theta_1$ between the outermost field of view of the area-array camera and the earth-pointed axis of satellite;

step 2: calculating a maximum rotation angle $\omega_{max}$ allowed by the satellite according to a minimum exposure time T of the detector on the satellite and a worst ground pixel resolution r of the detector on the satellite;

step 3: selecting a rotation speed of satellite, $\omega<\omega_{max}$, and calculating a ground imaging width $L_1$ of the detector in the satellite flight direction;

step 4; calculating a ground imaging width $L_2$ of the detector in a direction perpendicular to the satellite flight direction according to a photographing frequency f of the detector and the ground imaging coverage width $L_1$ of the detector in the satellite flight direction described in step 3;

step 5. setting the rotation speed $\omega$ of the satellite selected in step 3 to be the satellite rotation speed relative to a ground, so that there is no gap between two adjacent areas that are subjected to circular scanning imaging of the detector, thereby achieving ultra-wide circular scanning imaging by the optical satellite.

Embodiment 2: this embodiment is a further explanation of a method for ultra-wide circular scanning imaging by an optical satellite described in Embodiment 1 or 2. The specific method of calculating of the angle $\theta_1$ between the outermost field of view of the detector and a earth-pointed axis of satellite according to the width W required for ground imaging coverage in the direction perpendicular to the satellite flight direction and the height h of the satellite orbit, which is described in step 1, is implemented by calculating an Equation:

$$W=2h \tan \theta_1 \qquad (1)$$

Embodiment 3: this embodiment is a further explanation of a method for ultra-wide circular scanning imaging by an optical satellite described in Embodiment 1 or 2. The calculating of the maximum rotation angle $\omega_{max}$ allowed by the satellite according to the minimum exposure time T of the detector on the satellite and the worst ground pixel resolution r of the detector on the satellite, which is described in step 2, is implemented by calculating an Equation:

$$\omega_{max} = \left(\frac{r}{T} - V_s - V_o\right) / \left(\frac{W}{2}\right) \qquad (2)$$

wherein, $V_s$=7.06 km/s, which is the moving speed of a satellite lower point on the ground and $V_o$=0.4636 km/s, which is the linear speed at the satellite lower point caused by an earth rotation.

Embodiment 4: this embodiment is a further explanation of a method for ultra-wide circular scanning imaging by an optical satellite described in Embodiment 1 or 2. The selecting of the rotation speed of satellite, $\omega<\omega_{max}$, and calculating of a ground imaging width $L_1$ of the detector in the satellite flight direction, which are described in step 3, is implemented by calculating an Equation:

$$L_1 = (V_s + V_o)\frac{2\pi}{\omega}. \qquad (3)$$

Embodiment 5: this embodiment is a further explanation of a method for ultra-wide circular scanning imaging by an optical satellite described in Embodiment 1 or 2. The calculating of a ground imaging width $L_2$ of the detector in a direction perpendicular to the satellite flight direction according to a photographing frequency f of the detector and the ground imaging coverage width $L_1$ of the detector in the satellite flight direction described in step 3, which is described in step 4, is implemented by calculating an Equation:

$$L_2 = \omega \frac{W}{2} \frac{2\pi}{f}. \qquad (4)$$

On the basis of conventional satellite array imaging, the disclosure provides an imaging method which utilizes the whole satellite to rotate around the earth-pointed axis and the camera to perform circular scanning imaging for achieving ultra-large width. The coverage of satellite ground imaging is maximized thereby achieving ultra-large width circular scan imaging of low-orbit satellites on the order of one thousand kilometers.

In the traditional area-array and push-broom satellite imaging, if a certain area is to be completely covered, it needs to revisit the area multiple times, that is, multi-orbit data splicing; although the addition of side swing capability can increase the coverage of the area, the time resolution and coverage capability of one-time acquisition of ground data cannot meet current mission requirements for a rapid response of satellite.

The disclosure designs a method for rotating around the earth-pointed axis of satellite by the optical axis of the detector, and taking pictures at a specific frequency by the camera during the process of the satellite flight, in consideration of the sizes, weight, power consumption limitations and imaging capabilities of the satellite. The disclosure discloses a method and an apparatus for ultra-wide circular scanning imaging by an optical satellite, the method is with respect to the problem of limited width in an area-array imaging method adopted on a traditional remote sensing satellite. The method of the disclosure is simple, reliable and easy to implement, expands the imaging range, and expands the application field of optical small satellites.

The foregoing is only a preferred embodiment of the present disclosure and is not intended to limit the present disclosure, and any modifications, equivalent substitutions and improvements made within the spirit and principles of the present disclosure are intended to be included within the scope of protection of the present disclosure.

What is claimed is:

1. A method for ultra-wide circular scanning imaging by an optical satellite, wherein the method is implemented based on a detector, a processor and a memory; the detector is used for imaging and is implemented by an area-array camera, the processor is used for imaging processing and sending a processed signal to a memory for storage, and the memory is used for storing the processed image sent by the processor, the specific steps of the method for ultra-wide circular scanning imaging by the optical satellite comprising:

calculating an angle $\theta_1$ between an outermost field of view of the detector and an earth-pointed axis of the satellite according to a width W required for ground imaging coverage in a direction perpendicular to a satellite flight direction and a height h of a satellite orbit;

installing the detector on a side surface of the satellite according to the angle $\theta_1$ between the outermost field of view of the area-array camera and the earth-pointed axis of the satellite, so that an angle between an optical axis of the detector and the earth-pointed axis of the satellite is equal to the angle $\theta_1$;

calculating a maximum rotation angle $\omega_{max}$ allowed by the satellite according to a minimum exposure time T of the detector on the satellite and a worst ground pixel resolution r of the detector on the satellite, such that $$\omega_{max} = \left(\frac{r}{T} - V_s - V_o\right) / \left(\frac{W}{2}\right);$$

and wherein, $V_s$=7.06 km/s, which is the moving speed of a satellite lower point on the ground and $V_0$=0.4636 km/s, which is a linear speed at the satellite lower point caused by Earth's rotation;

selecting a rotation speed of the satellite, $\omega<\omega_{max}$;

calculating a ground imaging width $L_1$ of the detector in the satellite flight direction, wherein $$L_1 = (V_s + V_o)\frac{2\pi}{\omega};$$

calculating a ground imaging width $L_2$ of the detector in a direction perpendicular to the satellite flight direction according to a photographing frequency f of the detector and the ground imaging width $L_1$ of the detector in the satellite flight direction, wherein $$L_2 = \omega \frac{W}{2} \frac{2\pi}{f};$$

and setting the rotation speed $\omega$ of the satellite to be the satellite rotation speed relative to the ground, so that the ground imaging width $L_2$ of the detector in a direction perpendicular to the satellite flight direction is greater than a predetermined threshold.

2. An apparatus for ultra-wide circular scanning imaging by an optical satellite, wherein the apparatus comprises a detector, a processor and a memory; the detector is used for imaging and is implemented by an area-array camera, the processor is used for imaging processing and sending a processed signal to a memory for storage, and the memory is used for storing the processed image sent by the processor, wherein the memory stores computer-executable instructions to execute a method for ultra-wide circular scanning imaging by the optical satellite when being performed by the processor, the specific steps of which comprising:

calculating an angle $\theta_1$ between an outermost field of view of the detector and an earth-pointed axis of the satellite according to a width W required for ground imaging coverage in a direction perpendicular to a satellite flight direction and a height h of a satellite orbit;

installing the detector on a side surface of the satellite according to the angle $\theta_1$ between the outermost field of view of the area-array camera and the earth-pointed axis of the satellite, so that an angle between an optical axis of the detector and the earth-pointed axis of the satellite is equal to the angle $\theta_1$;

calculating a maximum rotation angle $\omega_{max}$ allowed by the satellite according to a minimum exposure time T of the detector on the satellite and a worst ground pixel resolution r of the detector on the satellite, such that $$\omega_{max} = \left(\frac{r}{T} - V_s - V_o\right) / \left(\frac{W}{2}\right);$$

and wherein, $V_s$=7.06 km/s, which is the moving speed of a satellite lower point on the ground and $V_0$=0.4636 km/s, which is a linear speed at the satellite lower point caused by Earth's rotation;

selecting a rotation speed of the satellite, $\omega<\omega_{max}$;

calculating a ground imaging width $L_1$ of the detector in the satellite flight direction, wherein $$L_1 = (V_s + V_o)\frac{2\pi}{\omega};$$

calculating a ground imaging width $L_2$ of the detector in a direction perpendicular to the satellite flight direction according to a photographing frequency f of the detector and the ground imaging width $L_1$ of the detector in the satellite flight direction, wherein $$L_2 = \omega \frac{W}{2} \frac{2\pi}{f};$$

and setting the rotation speed of the satellite to be the satellite rotation speed relative to the ground, so that the ground imaging width $L_2$ of the detector in a direction perpendicular to the satellite flight direction is greater than a predetermined threshold.

* * * * *